United States Patent Office 3,261,463
Patented July 19, 1966

3,261,463
DRYING AND SEPARATION OF PARTICULATE SOLIDS OF DIFFERENT SPECIFIC GRAVITIES
Geoffrey Frank Eveson and George Thomas Richards, Sheffield, England, assignors to Head, Wrightson & Company Limited
Filed Feb. 7, 1962, Ser. No. 171,741
26 Claims. (Cl. 209—11)

This invention concerns improvements relating to the drying and cleaning of small or fine coal, or other particulate materials, containing components of different specific gravities.

Competition from oil as fuel has created a demand that industrial small coal shall be easily-handleable and free-flowing, and has emphasised the value of adequate control of the moisture content of washed smalls by thermal drying after preliminary mechanical dewatering. Further, for many industrial purposes, it is adequate to remove the bulk of the free refuse from the raw small coal, thus preparing a cleaned-coal product of uniform ash content. Dry cleaning, if efficient, could meet most of the demand for refuse removal from small coal and enable easily-handleable products to be prepared.

In the application of dry-cleaning methods under present-day conditions, however, major problems arise from the surface moisture associated with the raw coal and the cost of dust collection devices which must be incorporated in any dry-cleaning plant treating small or fine coal. In most cases a dry-cleaning process can only operate successfully after the moisture content of the raw feed has been reduced. If dry-cleaning is to be efficient, it is essential that every particle in the feed to the cleaning unit should behave as a discrete body, free to move independently of any other particle during treatment in the unit. Dry cleaning can be made efficient by drying the coal before treatment. In most cases, the drying operation could be confined to the material below, say, one inch in size, and the whole of this fraction could then be cleaned in one, or more, dry-cleaning units. It would be cheaper to remove a small amount of water from raw small coal than to remove a considerable amount of water from washed smalls, even allowing for the fact that, when drying raw small coal, a greater tonnage of material would have to be treated.

The advantages associated with dry cleaning of coal are such that there should be a substantial market for any dry-cleaning process which can be designed to effect adequate cleaning of certain types of small and fine coal.

An object of the present invention, therefore, is to provide a process of, and apparatus for, drying and cleaning small or fine coal whereby problems above referred to can be satisfactorily dealt with and the advantages of dry cleaning for these grades of coal retained.

Known advantages of dry-cleaning include:

(i) The total inerts content of a small coal may be reduced by dry cleaning of the raw coal. Generally, treatment of a small coal in a wet-washing process results in the removal of refuse material and its replacement by an approximately equal amount of water, which is equally inert and possibly more objectionable in some forms of combustion plant.

(ii) The capital and operating costs of a dry-cleaning plant are less than those for a wet-washing plant, mainly because it is no longer necessary to incorporate a water-clarification and froth-flotation plant, or equipment to reduce the moisture content of the cleaned coal.

(iii) The cleaned products from a dry-cleaning plant are easily handled and transported, even in extremely cold climates.

(iv) Dry cleaning is applicable in arid regions.

Conditions which have been discussed above in regard to small coal are applicable also to a limited range of ores and other particulate materials and though it may be said that the present invention is more particularly concerned with the drying and cleaning of small coal, it will be evident to those skilled in the art that the features of the present improvements are applicable in appropriate instances to the treatment of such ores or other materials.

According to this invention, a process of drying and cleaning impure small or fine coal, or other particulate material, having components of different specific gravities, comprises delivering the said coal or other material (both hereinafter referred to simply as "material") into a fluidised bed or beds of discrete solid particles, maintaining the bed or beds in fluidised condition by a heated gaseous medium applied thereto in such a manner as to give, and retain in, the bed or beds a specific gravity effective to cause separation of the said material into two or more fractions of different specific gravities, and freeing the thus separated products from such of the discrete solid particles as discharge with them from the process.

By way of example, considering the said material to be composed of three categories of components (i.e. one of relatively low specific gravity, one of relatively high specific gravity and one of intermediate specific gravity), the process may be operated to separate in appropriately dried condition the component of relatively low specific gravity from the remainder, to separate the component of relatively high specific gravity from the remainder or to separate the material into the three above-mentioned categories.

In carrying the process of the invention into effect, it is preferred to arrange for the discrete solid particles to be heated as delivered for use in the fluidised bed or beds, i.e. pre-heated before use, in addition to being heated in the bed or beds by the heated gaseous medium.

It will be apparent that by the present process, wherein the heated discrete solid particles of a fluidised bed are used as an agent in effecting the drying and cleaning operations, the particulate material can be freed from surface moisture and dry-cleaning of this material effected in a highly efficient manner.

A further advantage is that drying and dry-cleaning of the material can be combined in one apparatus.

Another feature of the invention resides in an apparatus for drying and cleaning said material, comprising a fluidising vessel, a perforate support or supports in said vessel for a fluidised bed or beds of discrete solid particles, means for feeding said discrete solid particles to said vessel and on to said support or supports, means for supplying heated gaseous medium to said vessel under conditions operative to form and maintain said fluidised bed or beds, means for feeding said material to said vessel and delivering it into the fluidised bed or beds for separation of such material into two or more fractions of different specific gravities, and means for freeing the thus separated products from such of the discrete solid particles as are discharged with them from the fluidised bed or beds.

Preferably, the apparatus also comprises means for heating the discrete solid particles before feeding same to the fluidising vessel so that they enter such vessel in a pre-heated condition.

The discrete solid particles used for effecting the specific gravity separation may be of magnetite, ferrosilicon or other suitable inert magnetic material but when it is required to separate the raw feed into, say, two components at a relatively low specific gravity (e.g. below 1.7) it may be advantageous to use sand or other similar inert materials of comparatively low specific gravity to prepare the separating medium. For convenience, the material of the discrete solid particles will be hereinafter referred to simply as "magnetite." It will be understood, however, that wherever, in the following description, magnetic separators are employed in carrying out the process of the invention, the discrete solid particles which are used for the fluidised bed or beds in which the separation of the materials under treatment take place, must be of a magnetic nature. It would, of course, be inappropriate to use magnetic separators in the process when employing sand or similar inert material instead of a magnetic material for the above purpose and accordingly other means would be adopted for recovering the sand or similar inert material from the cleaned particulate material, as hereinafter indicated by way of example.

In order to enable the invention to be readily understood, reference is directed by way of example, to the accompanying largely diagrammatic drawings in which:

FIGURE 1 is a central vertical section of a fluidising vessel of these improvements, FIGURE 2 a plan of the upper perforate support in FIGURE 1, FIGURE 3 a view similar to FIGURE 1 of another construction of fluidising vessel, FIGURE 4 a plan of the upper perforate support of FIGURE 3, FIGURE 5 a plan of a modified form of the lower perforate support of FIGURE 1 or FIGURE 3, FIGURES 5a and 5b vertical sectional views of FIGURE 5 in planes at right-angles to each other, FIGURES 6, 6a and 6b views similar to FIGURES 5, 5a and 5b of another modified form of the lower perforate support of FIGURE 1 or FIGURE 3, FIGURE 7 a schematic diagram of one example of apparatus according to, and operative for carrying out the process of, the present invention, and FIGURES 8 to 18 each a diagram of a modification, by way of example, of the apparatus shown in FIGURE 7.

Parts in the drawings which are similar to one another are indicated by similar reference numerals.

Figure 1:
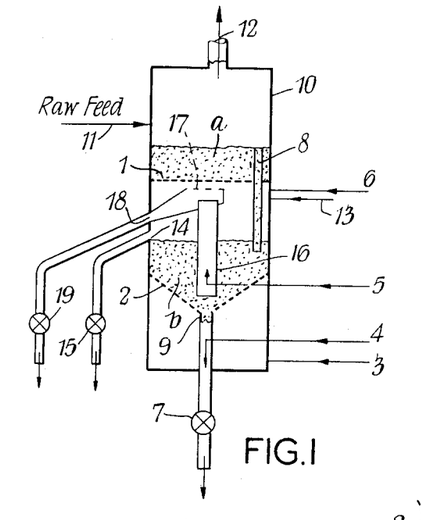
Figure 2:
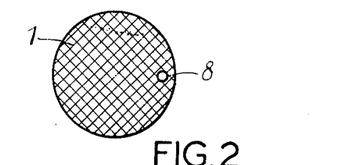
Figure 3:
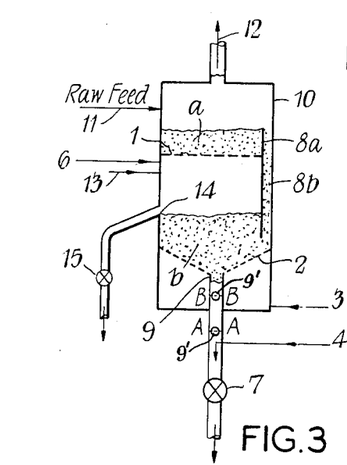

Two typical designs of the fluidising vessel are shown at 10 in FIGURES 1 and 3 of the drawings. The vessel is suitably cylindrical and, in each case, contains two perforate supports 1 and 2 for the material to be treated, although the number of such supports may be varied, for example as hereinafter described. The perforate nature of the supports is figuratively indicated by cross hatching, by way of example, in FIGURES 2 and 4. These supports may be of perforated metal, screen mesh, sintered metal, porous ceramic or sintered glass; it may be necessary to provide suitable structures to support these materials of construction and to provide means for protecting the upper surfaces from damage.

Figure 4:
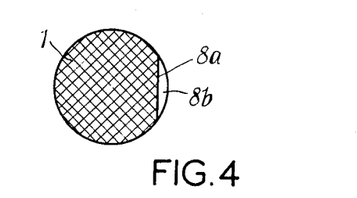

Heated gaseous medium is admitted to the fluidising vessel at a number of points 3, 4, 5 and 6, under controlled volume or mass and temperature at each point. Preferably, the temperature of the gas admitted at 3, 4 and 5 would generally be the same, or nearly so, whilst the temperature of the gas admitted at point 6 may generally be higher. As shown, the upper perforate support 1 is flat whilst the lower perforate support 2 is conical. However, it will be understood that the perforate supports are not necessarily of this form. For example, both may be conical, or the upper one flat or conical whilst the lower one may be elliptical and suitably inclined. In FIGURES 1 and 2, the support 1 is shown provided with a cylindrical overflow pipe 8. In FIGURES 3 and 4, the support 1 is shown provided with a chord-type overflow weir 8a forming a segmental downcomer 8b. The cylindrical overflow pipe 8, previously referred to, may be provided with a funnel-shaped weir at its upper end. In the case of an elliptical lower perforate support, provision would be made for discharging material from it at a point or points around its periphery. The conical lower support 2 in each case is shown opening downwardly into a centrally disposed discharge pipe 9. The cross-sectional dimensions of the overflow pipe 8, downcomer 8b and discharge pipe 9 are determined by factors such as the diameter of the largest particle in the raw feed material and the desired rate at which particulate material is to flow down each pipe.

Figures 5, 5B:
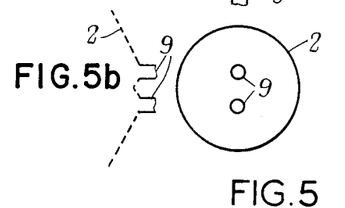
Figure 5A:
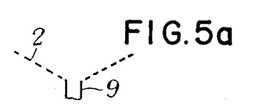
Figures 6, 6A, 6B:
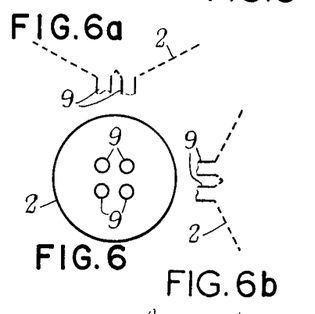

When the upper perforate support is flat, provision must be made for removing from the fluidising vessel, when necessary (e.g. when the plant is shut down or in the case of spontaneous combustion of the raw feed solids), all material remaining on or about that support. This provision, which is not shown in FIGURES 1 and 3, may conveniently take the form of a downwardly inclined pipe of suitable diameter, the upper end of which communicates with the fluidising vessel 10 at the level of the upper surface of the said perforate support whilst a gas-tight valve is fitted at some point along its length to prevent egress of solids and gases except when this is required. Moreover, the lower perforate support 2 may be provided with more than one discharge pipe 9. For example, two are indicated in FIGURES 5, 5a and 5b and four in FIGURES 6, 6a and 6b. For clearness, the support 2 is not shown cross-hatched in the plan view part of FIGURES 5 and 6. The two or four discharge pipes 9 would each be provided with a point, as at 4 aforesaid, for gas admission and the material discharged from each pipe would be brought together in some suitable fashion for subsequent treatment. All of the discharge pipes 9 are fitted with a gas-tight discharge device which, as shown for example at 7 in FIGURES 1 and 3, may be a rotary valve.

The material, so-called raw feed, to be treated, suitably pre-sized where necessary, is fed, as at 11, continuously into the fluidising vessel 10 above the upper perforate support 1, FIGURES 1 and 3. The feeding device used for this purpose should be designed to prevent the escape through it of gas from the fluidising vessel; it may conveniently take the form of a screw-type feeder, or of a rotary valve, provided with a hopper of similar device for containing the raw feed. The hot gaseous medium is applied so that after passing upwards through the supports 2 and 1, it forms the raw feed into a fluidised bed $a$ on the support 1 and thus partially or completely dries the feed material. The mass flow of gases into the fluidising vessel (and ultimately passing through the support 1) is controlled so that it is adequate for particles finer than a predetermined size, or sizes, to become entrained in the gases leaving the fluidising vessel at 12.

A fluidised bed $b$ of discrete solid particles is formed on the support 2. These particles may be of a magnetic or of a non-magnetic nature, as referred to previously, but they should be of a substantially inert substance, so far as their use in cleaning the raw feed is concerned. In accordance with indication already given above, the magnetic or other material is hereinafter referred to simply as magnetite. This material is prepared as a suitably sized fraction, e.g. as a wide size-range material, say finer than 100 mesh, or as a close size-range material, say 200–300 mesh. The magnetite may, or may not, be preheated in a suitable manner (referred to later) to some controlled temperature within the range, say, of 100°–400° C. It is then added to the fluidising vessel 10 at the point 13, preferably through a suitable form of distributor (not shown) which also prevents gases leaving the fluidising vessel at the point of magnetite addition. It may be convenient to admit the magnetite to the fluidising vessel in a stream of hot gases; these gases would then join the main gas stream passing upwards through the perforate support 1. The admission of the magnetite is such that, in association with the controlled mass flow of hot gases admitted to the fluidising vessel at points 3 and 4, the fluidised bed of magnetite is given an effective specific gravity of the value at which it is desired to separate the raw feed. Such specific gravity can be adjusted to any desired value by controlling the mass flow rate of the hot gases or the particle size of the magnetite (or, indeed, the specific gravity of the materials herein referred to as magnetite). The control is such that the hot gases escaping upwardly from the fluidised bed b on the support 2, together with the gases added at 6 and 13 (and at 5 in the case of FIGURE 1), pass through the perforate support 1 and operate in and form the fluidised bed a of raw feed material on this latter support to dry the feed as stated.

The overflow indicated at 8 in FIGURE 1 and at 8a in FIGURE 3, operates for continuous discharge of material from the fluidised bed a on the upper support 1 into the fluidised bed b maintained on the lower support 2. In each case, the downcomer 8 or 8b protrudes for a predetermined distance into the fluidised bed b in order to prevent excessive escape of gases from the interstices of the fluidised bed b to the space above the fluidised bed a; in this way, gases admitted to the fluidising vessel 10 are constrained to pass through the upper perforate support 1. The depth of the fluidised bed a may be varied by adjusting the height of the top end, or of the overflow weir aforesaid, of 8 (FIGURE 1), or of 8a (FIGURE 3) above the perforate support 1. Similarly, the depth of the fluidised bed b may be varied by adjusting the height of an overflow weir at the point 14 at which material is discharged from the upper surface of such bed; this latter adjustment necessitates that provision also be made for adjusting the length of the downcomer 8 (FIGURE 1), or 8b (FIGURE 3) to maintain the correct extent of immersion of this downcomer in the fluidised bed b. In the case where, for instance, the fluidising vessel is 4 feet in diameter and operated to treat, per hour, 25 tons of raw coal of particle size 1 inch to 0, the depth adopted for each of the fluidised beds a, b may be about 1 foot and the pressure drop across each fluidised bed about 100 lbs. per square foot. Obvious, however, these conditions may be varied, e.g. according to the specific gravity of the fluidised bed of magnetite on support 2 and according to the diameter of the fluidising vessel 10 in relation to the throughput or the size of the coal being treated.

Drying of raw feed may conveniently be completed within the fluidised bed b of magnetite, in which case the feed, simultaneously therewith, is separated into two fractions differing in respect of specific gravity. If the raw feed is completely dried in the upper fluidised bed a, it will, of course, only be subjected to specific gravity separation in the lower fluidised bed b though, of course, the two operations take place almost or practically simultaneously, or are carried out simultaneously in the sense that they take place in one and the same vessel.

Two methods of discharging the products of the separation from the fluidising vessel 10 are shown in FIGURES 1 and 3 respectively.

According to FIGURE 1, the fraction of lower specific gravity, arising from the feed material, is withdrawn continuously from the top of the fluidised bed b, together with some magnetite, at the point 14 and discharged through a gas-tight valve 15, which may be a rotary valve. The fraction of higher specific gravity sinks through the fluidised bed b and discharges through the down-pipe 9. It may be withdrawn continuously from this pipe through the gas-tight valve 7 though, if this procedure is adopted, it could be accompanied by large quantities of magnetite, necessitating the continuous addition of a correspondingly large quantity of magnetite to the fluidising vessel at the point 13. In order to overcome this possible disadvantage, hot gases can be added at the point 4 at a controlled rate sufficient to prevent, by an elutriating action, the discharge with the higher specific gravity fraction of the feed, through the pipe 9 and valve 7, of all but an acceptably small quantity of magnetite. The downwardly directed arrow head terminating the lead line from 4 indicates that the gases are introduced in a downwards direction in order to achieve a better dispersion than would be the case if the gases were introduced upwardly in the direction in which they ultimately travel. The eluted magnetite passes upwardly in pipe 9 and is inevitably accompanied by some of the smaller particles of the higher specific gravity fraction of the feed. A centrally disposed rising tube 16, which has a diameter somewhat larger than that of the pipe 9, is therefore arranged in the bed b so that the gap between its lower end and the perforate support 2 is adequate to permit unrestricted movement of even the largest particle, present in the raw feed, which sinks through the fluidised bed b and enters the pipe 9. However, substantially, all of the gases admitted at the point 4, together with the eluted magnetite and the accompanying small particles of the higher specific gravity fraction of the feed, enter the tube 16 and do not pass upwards in the fluidised bed b. If desired, this condition may be facilitated by fitting a skirt-type baffle adjacent to the lower end of the tube 16. Gases are admitted at the point 5, inside the tube 16, at a controlled rate sufficient to ensure that the specific gravity of the suspension of particles inside the tube 16 is less than that of the fluidised bed b. The upper end of the tube 16 is enclosed in a perforate hood 17 comprising a framework covered in screen cloth. The latter has apertures of such size that the gases and much of the magnetite, of smaller size than the small particles of the higher specific gravity fraction of the feed, pass through the screen cloth, whilst the small particles of the higher specific gravity fraction of the feed, together with the remainder of the magnetite, are retained in the hood and slide down its suitably inclined floor to leave the fluidising vessel at the point 18. They then discharge continuously through the gas-tight valve 19, which may be a rotary valve, and may join the material discharged through valve 7 prior to subsequent treatment. Magnetite passing through the apertures in the hood 17 falls back on to the top of the fluidised bed b.

According to FIGURE 3, the fraction of lower specific gravity, arising from the feed material, is withdrawn continuously from the top of the fluidised bed b, together with some magnetite, at the point 14 and discharged through a gas-tight valve 15. The fraction of higher specific gravity sinks through the fluidised bed b and discharges through the down-pipe 9. At two planes (AA and BB) sensing devices 9' are sited in, or around, this pipe; each device transmits a suitable signal (pneumatic, hydraulic or electrical) when the level of solids in the pipe rises above, or falls below, the appropriate plane. The transmitted signals are used to operate a variable speed motor driving the gas-tight valve 7. Operation is adjusted so that the level of the column, of the higher specific gravity fraction, in the pipe 9 always remains between the planes AA and BB. This means that the capacity of the valve 7 is sufficiently large to allow the free passage of all particles of the feed admitted to the fluidised bed of magnetite or other discrete solid particles. Consequently it is not possible to feed solids at a high enough rate to keep the conduit 9 full to a level above BB. Hot gases are admitted at point 4 at a controlled rate sufficient to maintain the interstitial spaces of the column of the fraction of higher specific gravity substantially free from the magnetite passing with this fraction into the pipe 9 from the fluidised bed b. This magnetite forms a suspension of low specific gravity above the column of the fraction of higher specific gravity in the pipe 9. Operating conditions must be established so that the specific gravity of this magnetite suspension is always equal to, or less than, that of the fluidised bed b. The hot gases moving upwardly from pipe 9 into the fluidised bed b then assist in the fluidisation of this bed, or they may be distributed within this bed by means of a suitable perforate baffle (not shown) arranged adjacent to the upper end of the pipe 9, or they may be caused to move into a tube extending through the fluidised bed (as indicated by the tube 16 in FIGURE 1, and its associated point 5 of hot gas admission).

Figure 7:
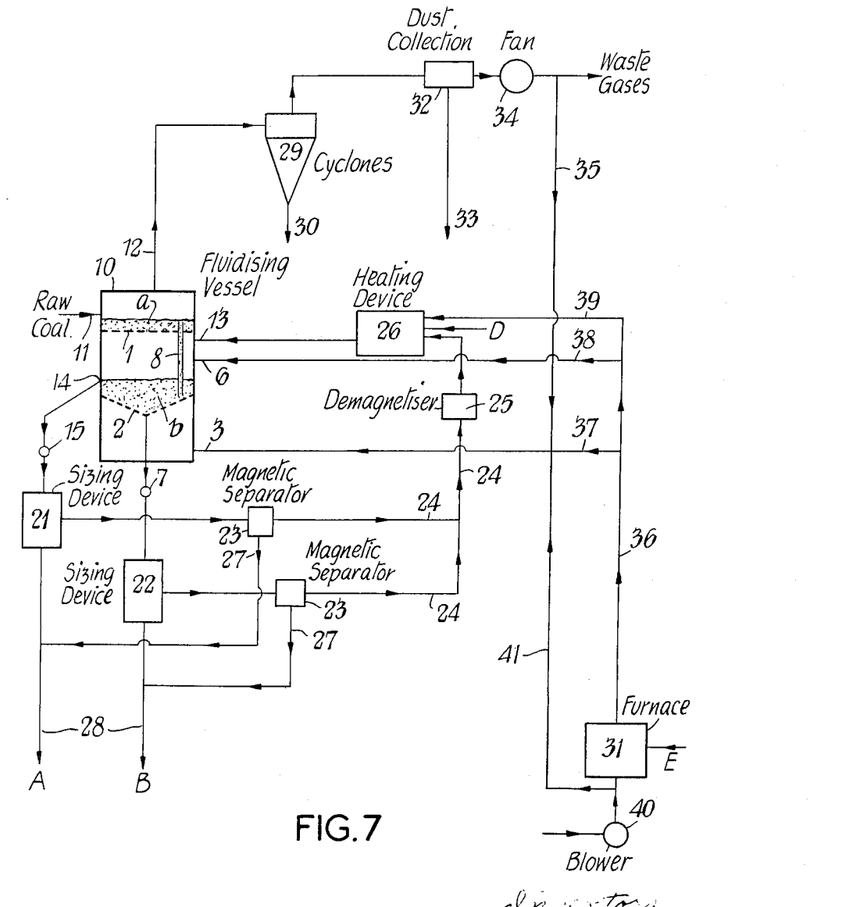

The example of apparatus shown in FIGURE 7 is particularly designed for the treatment of raw fine or small coal. The fluidising vessel 10 is shown only diagrammatically and may be of the form shown in FIGURE 1, FIGURE 3, or some convenient combination or modification of these forms. Only two points 3 and 6 for admission of hot gases to the fluidising vessel are shown though, as previously stated, hot gases may also be admitted with the magnetite at 13. Again, the fractions arising from the specific gravity separation occurring within the fluidised bed b are shown as being discharged, together with magnetite, respectively by overflow and withdrawal from the top and bottom regions of the fluidised bed. It will be appreciated that this is a convenient simplification of the various possible arrangements above detailed and shown in FIGURES 1 to 6.

Raw coal, sized for instance ⅜″–0, is fed continuously to the fluidising vessel at 11 and, is partially, or completely, dried, and de-dusted in the fluidised bed a. It is continuously discharged at 8 into the fluidised bed of magnetite b and there separated, at a controlled specific gravity, into a clean coal fraction which is discharged through valve 15, and a reject fraction which is discharged through valve 7. These fractions are passed to respective sizing devices 21 and 22 which are preferably at atmospheric pressure. These devices 21, 22 may take the form of vibrating screens, or of a vibrating screen divided longitudinally to accommodate the cleaned coal and reject on different portions of its surface, or of the known Dutch State Mines sieve bends or similar stationary screens. The apertures in said sizing devices are larger than the particle size of the magnetite so that all, or as much as possible, of the magnetite, together with some finely-divided cleaned coal and reject material, passes through the sizing surface or surfaces. These products are then passed on to dry-type magnetic separators, 23, which recover the magnetite. The latter is then returned at 24, by way of a demagnetiser 25 if the use of this proves to be necessary, to a heating device 26. Make-up magnetite is added, as at D, to the magnetite stream at the inlet to the heating device 26. In this device, the magnetite is heated by direct or indirect contact with hot gases to some controlled temperature within the range 100°–400° C.; it then returns to the fluidising vessel at 13. Non-magnetic particles leaving the magnetic separators 23 at 27 join the respective oversize products, leaving the sizing devices 21 and 22, at 28. Where necessary, these oversize products can be passed to dry-type magnetic separators (not shown) or to air or hot gas elutriators (also not shown) where their residual magnetite content is removed and added to the stream 24. The final products, A and B, may pass to bunkers (not shown) or be disposed of in some other conventional manner; the clean coal product may be dust-proofed, if required, by spraying with a suitable oil.

Gases leaving the top of the fluidising vessel 10 at 12 carry finely-divided solids from the fluidised bed a of raw coal formed on the perforate support 1. As previously stated, the mass flow of gases into the fluidising vessel (and ultimately passing through the support 1) is controlled so that the raw feed may be classified at some pre-determined small particle size. Of the particles removed at 12 as aforesaid those coarser than, say, 5–10 microns are removed from the gases in cyclones 29; they then pass at 30 to join the clean coal product A, or the reject product B, or to be used as fuel in a furnace 31, (as indicated at E), or to be disposed of in any other suitable manner. The partially-cleaned gases with the remainder of the particles are passed from the cyclones 29 through further dry-type dust collection equipment 32; the collected dust, removed as at 33, is used as fuel for the furnace 31 or is disposed of in some other way. The cleaned gases pass through a fan 34 and are then split into two portions, provision being made to control the proportion of the total gas flow passing to each portion. One portion passes, as at 35, to join the stream of gases entering the fluidising vessel at 3. The second portion, being waste gases, is vented to atmosphere. Sufficient gases are vented to atmosphere to maintain at satisfactory levels the moisture content and temperature of the hot gases circulating to the fluidising vessel at 3. The gas conditions, of course, must be such as substantially neither to invite any deterioration or decomposition of the coal under treatment nor to lead to condensation of acid mists in any portion of the apparatus.

Combustion gases from the furnace 31 are led at 36 to be distributed between one or more of three possible streams. One stream 37 joins the re-circulated gas stream 35 and must be sufficient to replace the mass of gas vented to atmosphere after the fan 34 and any other gas lost from the circuit, as well as to maintain the temperature of the gases entering the fluidising vessel 10 at 3 at the desired value. A second stream 38, enters the fluidising vessel 10 at 6 below the upper perforate support 1. A third stream 39 is supplied to the heating device 26 and then may pass into the fluidising vessel with hot magnetite at 13 or the gases may pass into the fluidising vessel at some other point below the support 1. Air for combustion is supplied by a blower 40 to the furnace 31. If desired, a portion of the blower delivery may by-pass the furnace, as at 41, to reduce to any desired value the temperature of the gas stream entering the fluidising vessel at 3. The blower 40 and the fan 34 combined must be capable of maintaining any required mass flow rate of gases through the fluidising vessel. Operating conditions could be arranged so that, for instance, the fluidising vessel operated at substantially atmospheric pressure whilst gas lines between the blower 40 and the fluidising vessel were at pressures above atmospheric and the gas line between the fluidising vessel and the fan 34 was at a pressure below atmospheric. Provision may be made to control the free oxygen content of the hot gases in various portions of the circuit.

The following description and operating data represent a specific embodiment of the process of the invention and may be regarded as being typical of the operation of a plant arranged as in FIGURE 7, and incorporating a fluidising vessel of the design shown in FIGURE 1. This illustrative embodiment refers to the drying and dry cleaning of a raw coal feed, sized ³⁄₁₆ inch–0 and containing 5 percent of surface moisture, and in which the majority of the particles have a specific gravity within the range 1.26–2.60.

Hot gases are supplied, at a pressure of about 5 pounds per square inch gauge, to various points of the fluidising vessel at the following temperatures and mass flow rates (based on the area of the fluidised bed b or a):

Point 3: 150° C.; 190 lbs. per hour per square foot.
Point 4: 150° C.; 150 lbs. per hour per square foot.
Point 5: 150° C.; 90 lbs. per hour per square foot.
Point 6: 350° C.; 2570 lbs. per hour per square foot.

Ordinary magnetite, sized at 200–300 British Standard mesh, is fed at a temperature of 150° C. into the fluidising vessel at point 13 at a rate of 1200 lbs. per hour per square foot of fluidised bed area. This magnetite is fluidised by the gases admitted at point 3 below the perforate support 2, producing a fluidised bed b in which a specific gravity separation of the raw feed material can be made at a partition density of 1.90. When the height of the overflow weir 14 is adjusted to give a fluidised bed b of a depth of 6 inches, the pressure drop across this bed (omitting the pressure drop across the perforate support) is 11–12 inches, water gauge.

Having established a fluidised bed b of hot magnetite and adjusted the temperature and mass flow rate of gases admitted at points 3, 4, 5 and 6, the raw feed is admitted to the fluidising vessel at point 11 above the perforate support 1 at a rate of 800 lbs. (dry basis) per hour per square foot of fluidised bed area. The majority of the surface moisture present in the feed is evaporated in the fluidised bed a. The depth of this bed is maintained at 6 inches and the pressure drop across it (omitting the pressure drop across the perforate support) is 4–5 inches, water gauge. The particles of the raw feed are maintained in a fluidised state within bed *a* by the hot gases passing upwards through the perforate support 1 at a mass flow rate of 3000 lbs. per hour per square foot. The temperature of the gases immediately below the support 1 is about 300° C. Hot gases leave the fluidising vessel at 12 at a temperature of about 60° C. and entrained in them is the majority of the particles, finer than 0.5 mm., which were present in the raw feed material. These particles are recovered from the gases in the cyclones 29 and the dust collection equipment 32.

The number and sizes of cyclones and of bag-filter units required respectively at 29 and 32, and the pressure drop to be expected from their use, may be calculated using the following data:

One standard 5 foot diameter, high efficiency cyclone, will deal with the gases arising from 10 square feet of fluidised bed area; the pressure drop across each cyclone will be about 5 inches, water gauge.

3000 square feet of filter cloth area is required to treat the gases arising from 10 square feet of fluidised bed area; the pressure drop across a unit incorporating 3000 square feet of filter cloth would be 4–5 inches, water gauge.

Partially or completely dried particles of the raw feed, at a temperature of about 60° C., overflow from the fluidised bed *a* and pass down the cylindrical overflow pipe 8 into the fluidised bed *b* of heated magnetite particles. Any remaining surface moisture is removed from the overflow particles within this fluidised bed and simultaneously this feed material is subjected to a specific gravity separation. Cleaned coal, consisting mainly of material having a specific gravity below 1.90 (but also containing some misplaced material of higher specific gravity), is discharged, together with magnetite, from the top of the fluidised bed *b* at 14 and passes through the rotary valve 15. For one particular raw coal, the rate of discharge of cleaned coal was 500 lbs. per hour per square foot of fluidised bed area and this coal was accompanied by 900 lbs. of magnetite per hour per square foot of fluidised bed area. Reject material, consisting mainly of particles having a specific gravity above 1.90 (but also containing some misplaced material of lower specific gravity), sinks to the bottom of the fluidised bed *b*. A portion of this reject material is discharged, together with some magnetite, through the rotary valve 7; the remainder, also associated with some magnetite, passes up the tube 16 and is discharged, after some of the associated magnetite has passed through the perforations in the hood 17, through the rotary valve 19. Particles of all sizes present in the raw feed material (i.e. $\frac{3}{16}$ inch–0) will appear in each of the products discharged through the valves 7, 15 and 19, but the majority of the coarser reject particles is discharged through the valve 7 and the majority of the finer reject particles is discharged through the valve 19. By way of example, for the particular raw coal cited above, the rates of discharge of reject material and of associated magnetite, and the size analysis of the reject material, at points 7 and 19 are:

Point 7:
  Reject material—70 percent: $\frac{3}{16}$ inch—1.67 mm.
    30 percent: 1.67 mm.
  Rate of discharge of reject material—225 lbs. per hour per square foot of fluidised bed area.
  Rate of discharge of magnetite—166.5 lbs. per hour per square foot of fluidised bed area.

Point 19:
  Reject material—20 percent: $\frac{3}{16}$ inch—1.67 mm.
    75 percent: 1.67 mm.
  Rate of discharge of reject material—75 lbs. per hour per square foot of fluidised bed area.
  Rate of discharge of magnetite—133.5 lbs. per hour per square foot of fluidised bed area.

The products discharged from the valves 7 and 19 are combined and passed to a vibrating screen 22 fitted with a 30 British Standard mesh screen cloth; the cleaned coal product is passed to a similar screen 21. The screening area of each screen is calculated assuming the screen capacity to be 80 lbs. of dry feed solids per hour per square foot of screening area.

The underflows from screens 21 and 22 pass separately to the magnetic separators 23. Each of these may be of the alternate pole, magnetic overband type and the size of each is calculated assuming that each separator can recover 10 tons of magnetite per hour per foot width of magnet, from the screen underflow which contains magnetite sized 200–300 British Standard mesh and non-magnetic particles finer than 0.5 mm.

The invention is not restricted to the apparatus above particularly described and illustrated, because a number of modifications of it are possible without departing from the scope of the present improvements.

Figure 8:
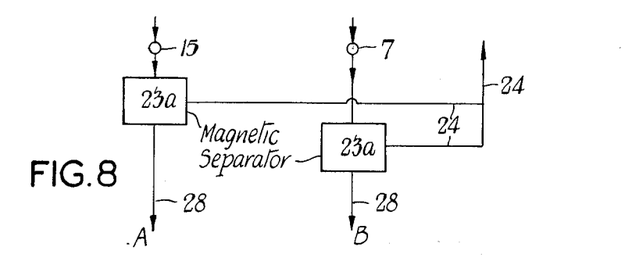

For example, in one case illustrated by FIGURE 8, the products leaving the fluidising vessel through the valves 7 and 15 pass directly to magnetic separators 23a, so that the sizing devices 21 and 22 and magnetic separators 23 aforesaid are omitted.

Figure 9:
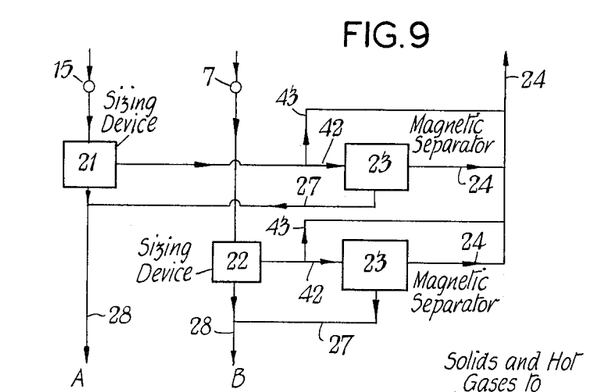

As another modification shown in FIGURE 9, only a portion of the underflows from the sizing devices 21 and 22 are passed to the magnetic separators 23, as at 42, the remainder of the underflows passing untreated, as at 43, to the stream 24. The portion 42 which is treated at 23 is made sufficiently large so that the concentration of non-magnetic material in the particles returned to the fluidising vessel 10 at 13 is maintained at an acceptable level.

Figure 10:
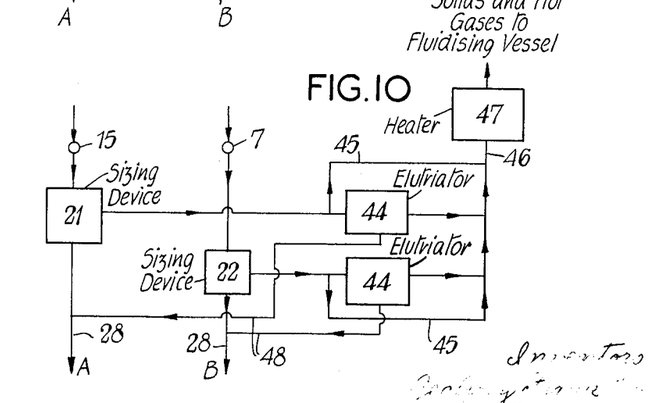

According to FIGURE 10, when using sand or similar inert, non-magnetic material (herein generally called "sand"), in place of a magnetic material to form the fluidized bed *b*, the sand is recovered from the products by sizing devices, as at 21 and 22, as is possible owing to the dry condition of the products. The sand underflows from these sizing devices may be partially freed from associated contaminating particles arising from the raw feed by air or hot gas elutriation at 44; or only a portion of the underflows need be so treated, the remainder being by-passed, as at 45, to the other side of the elutriators 44. The sand and its associated contaminants may then pass, as at 46, to be heated in heating means 47 to a temperature sufficient to cause the combustion of all carbonaceous matter, before being returned to the fluidising vessel. The ash residue arising from this combustion will have a specific gravity similar to that of the sand. The other component from the elutriators may be returned, as at 48, to the over-flows 28 from the sizing devices 21, 22.

It will be understood that hot gas used for elutriation herein may be obtained directly or indirectly, from the hot gas stream leaving the furnace 31. Again, the hot gas (including heated air arising from contacting heated particles in an elutriator) leaving an elutriator may be used in the furnace 31 or elsewhere in the process, as may be appropriate to the nature of the hot gas and of any particles contained in it, with or without prior treatment in dust collection apparatus or in a magnetic separator.

Figure 11:
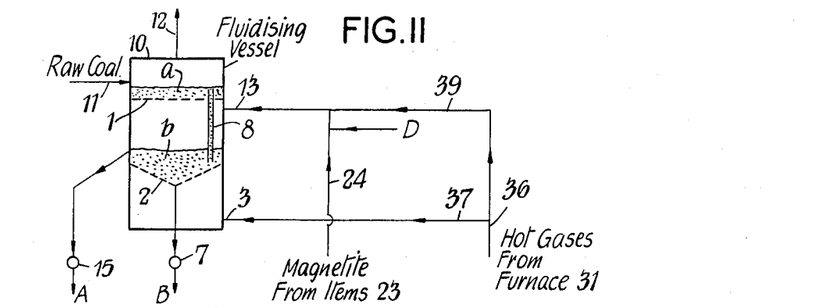

According to FIGURE 11, the magnetite recovered by the magnetic separators (not shown) may be introduced, at a pre-determined point distant from the fluidising vessel, into the stream of hot gases 36 leaving the furnace 31 and passing on to 39; the residence time of the magnetite in such hot gas stream would be made sufficient to enable the magnetite to become heated to the desired temperature before entering the fluidising vessel. By so doing, it would be possible to dispense with the heating device 26 as shown.

Figure 12:
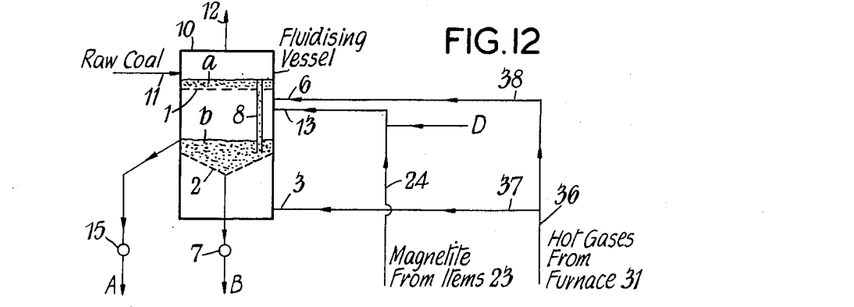

As illustrated by FIGURE 12, magnetite may be recirculated in the system, neither heating it in a device, such as 26, nor in a stream of hot gases 39. It would attain an equilibrium temperature dependent on the temperature within the fluidised bed $b$, its residence time in that bed, and the extent to which it becomes cooled having left the fluidising vessel 10.

According to a further modification, instead of deriving the fuel supply for the furnace 31 from the raw feed, as explained above, arrangement may be provided for using another suitable, readily-available, solid, liquid or gaseous material as the fuel.

Figure 13:
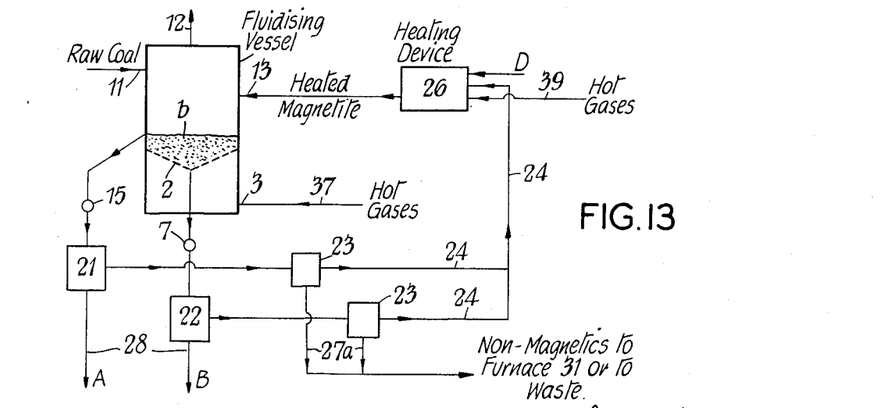

As depicted in FIGURE 13, the fluidising vessel 10 may contain only one perforate support namely 2. In this case, the raw feed, sized say ⅜″–0, and heated magnetite are fed separately, or together, on to this support where they are fluidised. Drying and separation of the raw feed proceeds simultaneously. When treating raw coal sized ⅜″–0 and preparing the fluidised bed $b$ of magnetite from particles sized 200–300 British Standard mesh, such that the raw coal is separated into two fractions at a partition density of 1.90, hot gases would be admitted at points 3, 4 and 5 (if the system of refuse discharge shown in FIGURE 1 is adopted) at the mass flow rates indicated in connection with the aforesaid specific embodiment of the process of the invention and at a temperature of 300° C. In other respects, the apparatus and its operation are substantially as discussed above with reference to FIGURE 7. This modification is intended for dealing with a raw feed which has no tendency to ball and which does not contain an excessive amount of very finely-divided material. Gas leaving the fluidising vessel at 12 would carry a considerably smaller amount of much finer particles than in the case of the apparatus shown in FIGURE 7, for which a larger mass flow of gas is used. Non-magnetic material present in the underflows from the sizing devices 21 and 22 may be delivered at 27a from the magnetic separators 23 to the furnace 31 or, as this non-magnetic material is not likely to be of the required quality for mixing with the cleaned coal product A, it can be diverted to waste alone or along with the non-magnetic material that leaves the fluidising vessel at 12.

Figure 14:
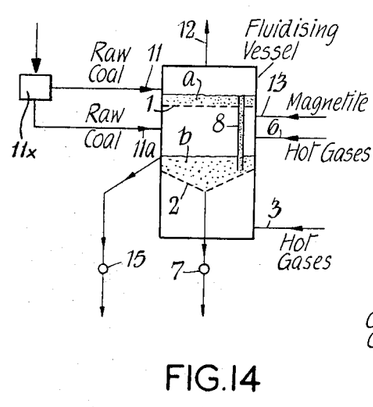

According to another modification, the fluidising vessel 10 with two perforate supports 1, 2, as shown in FIGURE 14, is used but arrangement is made at 11x to pre-screen the feed of raw coal. The latter may be sized, say 1″–0, and screened at, say, ⅜″. The material finer than ⅜″ is then fed to the upper perforate support 1, as at 11. There it is fluidised, dried partially or completely and de-dusted, and then it is discharged as at 8 (or alternatively 8b aforesaid) to the lower fluidised bed $b$ on the perforate support 2. The coarser fraction of the feed, (i.e. plus ⅜″) is fed, as at 11a to the space between the supports 1 and 2. The magnetite is also fed to such space, as at 13, and the feed material is separated, or dried and separated, in the fluidising vessel, and the separated products treated, as hereinbefore described.

Figure 15:
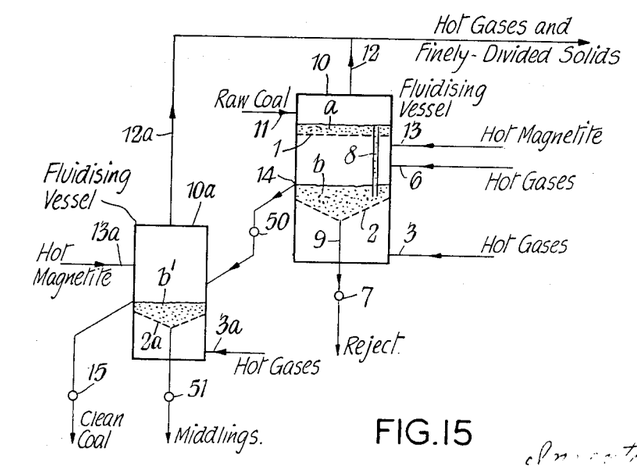

In FIGURE 15 two fluidising vessels 10, 10a are provided for the purpose of separating the raw coal into three products. The vessel 10 contains two perforate supports 1 and 2 and in the upper and lower fluidised beds $a$, $b$ respectively in this vessel, the raw coal, sized at say ⅜″–0, would first be dried, de-dusted, and then separated into a pure reject and a cleaned-coal product after the manner above described. The cleaned-coal product would then be passed, as at 14 and through a gas-tight discharge device or rotary valve 50, to the other fluidising vessel 10a containing one perforate support as at 2a and having a hot-gas supply as at 3a and a heated magnetite feed as at 13a, produced by its own magnetite heating device and/or furnace similar to 26 and 31 aforesaid. In this vessel 10a such product would be separated, in a fluidised bed $b'$ of magnetite on such support, into a clean coal and a middlings product discharging respectively through gas-tight discharge devices or rotary valves 15, 51. The three products namely clean coal, middlings and reject would subsequently be treated similarly to procedure (sizing and/or magnetic separation etc.) hereinbefore described as is believed will be understood. 12a is the outlet from the fluidising vessel 10a for finely divided solids and gases rising from the bed $b'$. If desired, there may be some degree of integration of the circuits associated with the two fluidising vessels 10, 10a. For instance, the cleaned coal product and its associated magnetite from the vessel 10 could be passed into the vessel 10a and a single magnetite heating device and/or furnace be used for both vessels.

Figure 16:
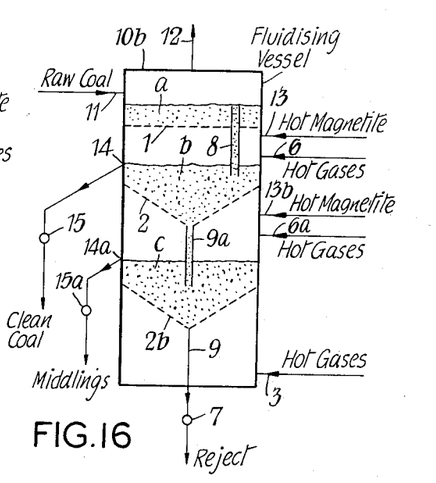

A further modification, shown in FIGURE 16 and favourable in certain circumstances, comprises a single fluidising vessel 10b having three perforate supports 1, 2, 2b spaced one above another to produce three fluidised beds $a$, $b$, $c$ in the one vessel. The raw feed is dried, or partially dried, and de-dusted in the uppermost fluidised bed $a$. It then passes at 8 to the bed $b$ next below, wherein it is separated into, say, a clean coal product (which discharges from the bed at 14 and past the gas-tight device or valve 15) and a combined middlings plus refuse product which is delivered by downpipe 9a to the lowest bed $c$. In the latter the combined product is further divided into a reject fraction which discharges at 9 as before, and a middlings product which discharges at 14a and past the gas-tight device or valve 15a. This arrangement would suitably be operated for the fluidising vessel to have sufficient hot gas admitted at 3 below the lowest perforate support 2b to produce a fluidised bed $c$ of magnetite of relatively high specific gravity on that support. Further hot gas would then be admitted at 6a below the middle perforate support 2 and, in conjunction with the gas admitted at 3 below the lowest support 2b, would produce a fluidised magnetite bed $b$, of lower specific gravity than the first, on this support 2. Further hot gas would also be admitted at 6 below the upper perforate support 1 and the combined hot gas would then flow through that support to fluidise the raw coal fed at 11. Corresponding supplies of hot magnetite are admitted at 13b and 13.

Figure 17:
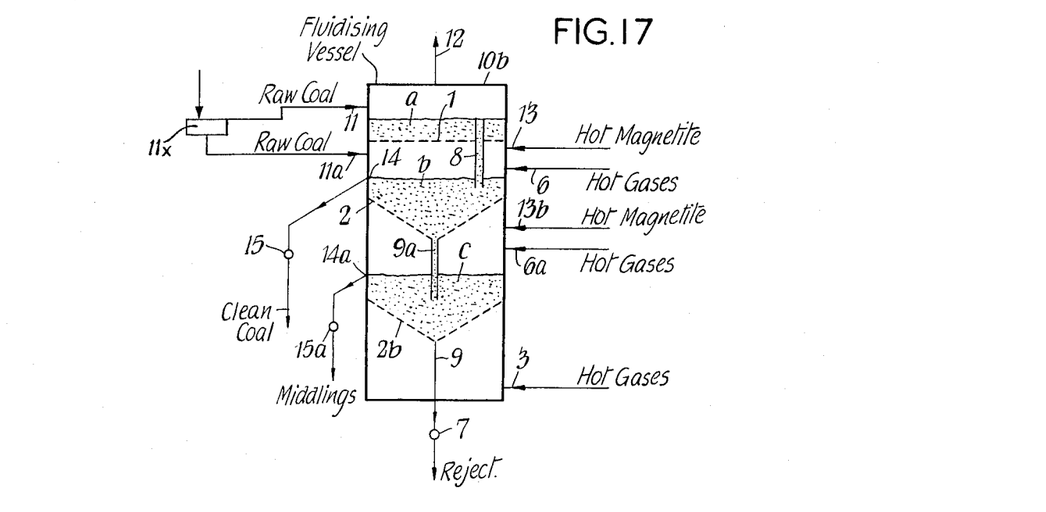
Figure 18:
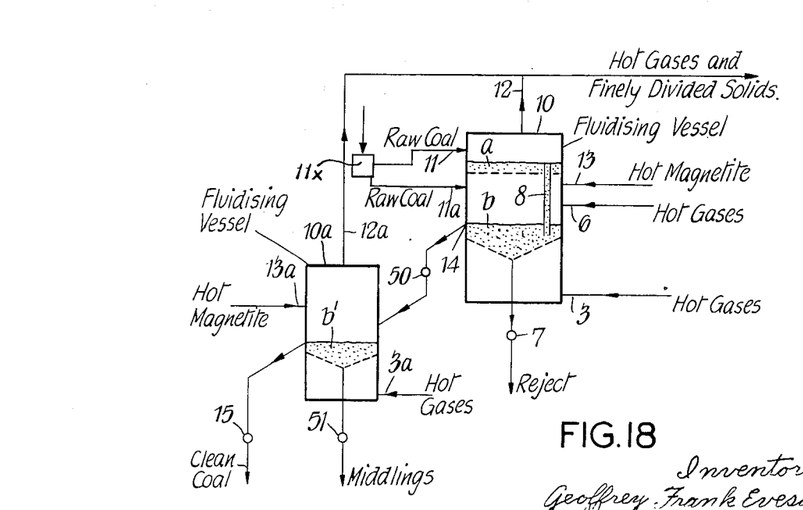

Other modifications embody combinations of the last three modifications, that is to say a raw coal, sized, say 1″–0, is divided into three products using any method outlined under the last two modifications and the essential feature of the first of the last three modifications according to which the raw coal would be screened at, say ⅜″, the finer fraction dried, or partially dried, and de-dusted, in an upper fluidised bed, and the coarser fraction added to the first of the fluidised beds of magnetite where it joins the finer material discharged from the uppermost fluidised bed. Thus, in FIGURE 17, the respective fractions, per FIGURE 14, are shown applied at 11 and 11a to the modification according to FIGURE 16 and in FIGURE 18 they are shown similarly applied at 11 and 11a to the modification according to FIGURE 15.

In the treatment of ores, or other particulate materials than ores and raw coal, the apparatus employed may be substantially the same as above described or according to any of the stated modifications, with such variations, if any, as may be apparent having in mind the nature of the raw product treated. With certain feed materials, fine particles of one or more of the constituents of the feed may be used as the discrete solid particles for forming the fluidised beds in place of the magnetic or other material above mentioned. In any case in which magnetic separators are not used, the discrete solid particles for the fluidised separating beds may be of either magnetic or non-magnetic material.

It will be apparent to those skilled in the art that the present invention has many advantages. It may here be mentioned for instance that it permits in a simple and efficient manner of simultaneous drying and dry-cleaning raw fine, or small, coal or other material of the nature aforesaid; the cleaned products obtained are dry and easily handleable; the advantages aforesaid of dry-cleaning are retained; the process and apparatus are suitable for the treatment of a wide range of particle size, so that for example it should be possible to clean efficiently particles of smaller size than can be treated in any, or most, existing dry-cleaning processes; only a small proportion of the raw feed need escape treatment in the fluidised bed or beds of magnetite or other discrete solid particles; and in addition the invention offers the possibility of effectively separating a raw feed into three products by dry-cleaning, even if the feed contains a relatively high proportion of middlings.

A further important advantage of the invention arises from the heated condition of the fluidised separating bed or beds. By the application of the hot gaseous medium, heat is imparted to both the particles of magnetite of the bed or beds and the materials being separated therein. A highly efficient dry condition of the magnetite particles, and of such materials, is thus attainable in such bed or beds. Unless this be the case, the dispersion of the magnetite particles in the fluidised bed or beds would be likely to be imperfect and the separation of said materials according to specific gravity differences inferior. The dry condition is enhanced by the heating of the solid particles of magnetite as delivered for use in the fluidised bed or beds, i.e. pre-heated before use, in addition to being heated in the bed or beds by the heated gaseous medium.

We claim:

1. Process of drying and cleaning impure small particulate material having components relatively of high-density and low-density, comprising the steps of preparing a fluidised bed of discrete solid particles which substantially are thermally inert in said process, said fluidised bed being of specific gravity intermediate between the specific gravities of said high-density and low-density components of said material, maintaining said bed in the fluidised condition by a heated gaseous medium led to such bed and operative substantially to maintain said intermediate specific gravity of said bed, delivering said material in non-fluidised condition to said fluidised bed whereby said low-density component is supported by the fluidised bed and said high-density component sinks through said bed, removing the thus separated said components from said bed, freeing said removed separated components from such of the discrete solid particles as discharge with them from said bed, heating a supply of the discrete solid particles separately from said bed, and continuously feeding said thus heated supply to said bed in quantity substantially to replace the discrete solid particles that are discharged with said separated components from said bed.

2. Process according to claim 1, wherein the relatively high-density separated component is discharged from the fluidised bed of discrete solid particles into a downpipe and the discharge operation is controlled to maintain a substantially constant level of the upper end of the column of such component formed in said downpipe.

3. Process according to claim 2, wherein hot gaseous medium is admitted to the column of relatively high-density separated component at a controlled rate sufficient to maintain the interstitial spaces of the column substantially free from discrete solid particles discharging into the downpipe with said high-density separated component.

4. Process according to claim 1, further comprising the steps of forming the particulate material into a fluidised bed prior to its delivery into the fluidised bed of discrete solid particles, and maintaining said fluidised bed first-mentioned in fluidised condition at least by heated gaseous medium escaping from the fluidised bed of said discrete solid particles whereby said material is subjected to drying treatment prior to delivery into the fluidised bed last-mentioned.

5. Process according to claim 4, wherein particles entrained in the gases leaving the fluidised bed of particulate material are led with said gases to a treatment to separate said particles from the gases and the particles thus separated from the gases are combusted to provide hot gaseous medium for use in the process.

6. Process according to claim 1, wherein the separated relatively high-density component is subjected, during discharge from the fluidised bed of discrete solid particles, to an elutriating action operative to control discharge of said discrete solid particles with such high-density component by causing them to be removed in an upward direction through said fluidised bed and to be isolated from such bed while thus passing therethrough.

7. Apparatus for drying and cleaning impure small particulate material having components relatively of high-density and low-density, comprising a fluidising vessel, at least one perforate support in said vessel for a fluidised bed of discrete solid particles, means for feeding said discrete solid particles to said vessel and on to said support, means for supplying heated gaseous medium to said vessel under conditions operative to form and maintain said fluidised bed, means for feeding a particulate material to be treated to said vessel and delivering it in non-fluidised condition to said fluidised bed for separation of said material into its said components, means for discharging the separated products from said fluidising vessel, means for freeing said separated products from such of said discrete solid particles as are discharged with them from said fluidised bed, means to convey the discharged said separated products to said freeing means, means for heating a supply of the discrete solid particles separately from said bed, and means operative continuously to feed the thus heated supply to said bed in quantity substantially to replace the discrete solid particles that are discharged with said separated products from said bed.

8. Apparatus according to claim 7, comprising a downpipe led from the perforate support for the fluidised bed of discrete solid particles to take away the relatively high-density separated material from said bed, a gas-tight discharge device disposed in said downpipe at a distance from the entry to the latter such that a column of said high-density separated material forms in said downpipe above said discharge device, and sensing devices applied to said downpipe adjacent the head of said column and operative to control said discharge device in a manner to maintain substantially constant level of said head of said column.

9. Apparatus according to claim 8, comprising means to admit hot gaseous medium into the column to maintain the interstitial spaces of the column substantially free from discrete solid particles discharging into the downpipe with the relatively high-density separated material.

10. Apparatus according to claim 7, comprising magnetic separators and means whereby the products of the separation effected in the fluidised bed of discrete solid particles are passed directly, that is in absence of the intermediary of sizing devices, to such magnetic separators for freeing said products from such particles.

11. Apparatus according to claim 7, comprising sizing devices for the products of the separation effected in the fluidised bed of discrete solid particles, magnetic separators disposed beyond said sizing devices, means for delivering only a portion of the underflows from such sizing devices to said magnetic separators to remove discrete solid particles therefrom, and means for delivering the magnetic particles recovered from the treated portion of said underflows and the remainder, not so treated, of the said underflows, back into a circuit containing the fluidising vessel.

12. Apparatus according to claim 7, comprising sizing devices for the products of the separation effected in the fluidised bed of discrete solid particles, and means for treating the underflows from said sizing devices by gas elutriation to remove contaminating particles from them.

13. Apparatus according to claim 12, comprising a heating device, means for delivering the elutriated and underflow components to said heating device to cause combustion of carbonaceous matter of such components, and means for delivering the heated components to the fluidising vessel.

14. Apparatus according to claim 7, comprising, in the case of the discrete solid particles of the fluidised bed being of magnetic material, magnetic separators operative for freeing the separated products from such of said discrete particles as are discharged with them from said fluidised bed, a furnace for supplying a stream of hot gases, means for delivering the discrete solid particles from said magnetic separators to said stream of hot gases to heat said particles, and means for thereafter delivering the stream to the fluidising vessel to supply the heated discrete particles to said fluidised bed.

15. Apparatus according to claim 7, comprising a single perforate support which is used for a fluidised bed of the discrete solid particles, magnetic separators operative for freeing the separated products, discharged from such bed, from said solid particles, means for delivering the latter particles back to said fluidising vessel to supply such particles to said fluidised bed, and means for delivering the non-magnetic discharge of said separators to a furnace for combustion therein to provide the heated gaseous medium.

16. Apparatus according to claim 7, comprising a second fluidising vessel fitted with a perforate support for a fluidised bed of discrete solid particles, this bed being operated to separate a middlings product from the relatively low-density material separated in said first-mentioned fluidising vessel, and a connection, between said vessels, fitted with a gas-tight flow-control device and operative to deliver said low-density material to said bed from the first-mentioned fluidising vessel past said flow-control device.

17. Apparatus according to claim 16, comprising a second perforate support disposed in said first-mentioned fluidising vessel above the perforate support therein for the fluidised bed of discrete solid particles, means for pre-screening the raw particulate material, means for feeding one fraction of the pre-screening to said second perforate support to be formed into a fluidised bed thereon, means for feeding the other fraction of the pre-screening to the bed on the other perforate support in said vessel, and means to deliver particulate material by overflow from the fluidised bed of particulate material on said second perforate support to the fluidised bed of discrete solid particles on said other perforate support.

18. Apparatus according to claim 7, comprising three perforate supports spaced one above another in the fluidising vessel to provide for three fluidised beds in the single vessel, the bed on the upper one of said supports being formed from the particulate material and the beds on the two lower ones of said supports being formed from the discrete solid particles, means for discharging the material from the upper bed into the bed of discrete particles on the middle one of said supports and a downcomer leading from the latter support for discharge of the relatively high-density separated material from the last-mentioned bed into the fluidised bed of discrete solid particles on the lowermost one of said supports.

19. Apparatus according to claim 18, comprising means for pre-screening of the particulate material, means for feeding one fraction of the pre-screening to the upper one of said supports to be formed into a fluidised bed thereon, and means for feeding the other fraction of the pre-screening to the bed of discrete particles on the middle one of said supports.

20. Apparatus according to claim 7, comprising a further perforate support arranged in the fluidising vessel above the one perforate support, the means for feeding the particulate material to said vessel and delivering it in non-fluidised conditions to said fluidised bed, being arranged to deliver said material first to said further perforate support, whereon this material is formed into a fluidised bed in which it is dried and dedusted by heated gaseous medium, and thereafter to deliver said dried and dedusted material from the last-mentioned fluidised bed to the fluidised bed of discrete solid particles, and the means for supplying heated gaseous medium to said vessel under conditions to form and maintain the fluidised bed of discrete solid particules being such as to supply same beneath the latter bed, and means for leading another supply of heated gaseous medium to the space in said vessel between said perforate supports.

21. Apparatus according to claim 20, comprising means for pre-screening the raw particulate material and for delivering the fine fraction of the screening to the further perforate support and the coarse fraction of the screening to the fluidised bed of discrete solid particles.

22. Apparatus according to claim 20, comprising an outlet connection on the fluidising vessel for leading away gaseous medium and any solids entrained therein, rising from the fluidised bed of particulate material, means associated with said outlet connection and operative for removing said solids from said gaseous medium, a furnace at a situation removed from said fluidising vessel, means for leading the solids removed from said gaseous medium to such furnace for combustion, and means for directing the combustion gases thus formed in the furnace partly to the fluidising vessel for use in forming the fluidised beds in such vessel and partly to the means for heating said supply of the discrete solid particles separately from the fluidised bed of discrete solid particles.

23. Apparatus according to claim 7, comprising a downpipe led from the perforate support for the fluidised bed of discrete solid particles to take away the relatively high-density separated material discharging from said bed, means for supplying heated gaseous medium to said downpipe to set up an elutriating action therein against discharge of said discrete solid particles into said downpipe with such high density separated material, and a rising tube disposed in said fluidised bed of discrete solid particles above the entry to the said downpipe to remove upwardly through said bed material eluted from such downpipe.

24. Apparatus according to claim 23, comprising a perforate hood enclosing the upper end of said rising tube and operative to separate eluted particles of the relatively high-density separated fraction from eluted particles of the discrete solid particles of the fluidised bed.

25. Apparatus for drying and cleaning impure small particulate material having components relatively of high-density and low-density, comprising a fluidising vessel, a first perforate support in said vessel for a fluidised bed of discrete solid particles, means for supplying heated gaseous medium to said vessel beneath said support under conditions operative to form and maintain said fluidised bed, a second perforate support arranged in said vessel above said perforate support and spaced above said fluidised bed, means for feeding the particulate material to said vessel and delivering it in non-fluidised condition on to said second support, means for leading heated gaseous medium to said vessel above said fluidised bed but beneath said second support and under conditions operative, with gaseous medium rising from said bed, to set up a fluidised bed of the particulate material on said second support, means for delivering such material from the last-mentioned fluidised bed to the one first-mentioned for separation of said material into its said components, means for discharging the separated products from said fluidising vessel, means for freeing said separated products from such of said discrete solid particles as are discharged with them from said first-mentioned fluidised bed, and means for re-circulating such freed discrete solid particles to said vessel so as to enter said first-mentioned fluidised bed adjacent to the upper surface thereof.

26. Process of drying and cleaning impure small particulate material having components relatively of high-density and low-density, comprising the steps of preparing a fluidised bed of discrete solid particles which substantially are thermally inert in said process, said fluidised bed being of specific gravity intermediate between the specific gravities of said high-density and low-density components of said material, maintaining said bed in the fluidised condition by a heated gaseous medium led to such bed below the same and operative substantially to maintain said intermediate specific gravity of said bed, forming the particulate material into a fluidised bed above the fluidised bed of discrete solid particles, and maintaining said fluidised bed of particulate material in fluidised condition by heated gaseous medium escaping from the fluidised bed of said discrete solid particles and by the further heated gaseous medium which is continuously supplied to the space between the two said fluidised beds, whereby the said material is subjected to drying prior to delivery into the fluidised bed of discrete solid particles, delivering said material to said fluidised bed of discrete solid particles whereby said low-density component is supported by the fluidised bed and said high-density component sinks through said bed, removing the thus separated said components from said bed, freeing said removed separate components from such of the discrete solid particles as discharge with them from said bed, continously re-circulating the freed discrete solid particles to said bed.

References Cited by the Examiner

UNITED STATES PATENTS

| | | | |
|---|---|---|---|
| 1,712,082 | 5/1929 | Koppers | 202—14 |
| 1,801,195 | 4/1931 | Fraser | 209—474 |
| 2,438,450 | 3/1948 | Nelson | 34—9 X |
| 2,586,818 | 2/1952 | Harms | 209—474 |
| 2,781,906 | 2/1957 | Fontein | 209—172.5 |
| 2,992,975 | 7/1961 | Murphree | 202—14 |
| 3,034,222 | 5/1962 | Municio | 34—57 |

FRANK W. LUTTER, *Primary Examiner.*

RICHARD A. O'LEARY, *Examiner.*